United States Patent
Yang et al.

(10) Patent No.: US 10,999,548 B2
(45) Date of Patent: May 4, 2021

(54) PIXEL SENSING CIRCUIT AND DRIVING METHOD THEREFOR, IMAGE SENSOR, AND ELECTRONIC DEVICE

(71) Applicant: BOE Technology Group Co., Ltd., Beijing (CN)

(72) Inventors: Shengji Yang, Beijing (CN); Xue Dong, Beijing (CN); Jing Lv, Beijing (CN); Xiaochuan Chen, Beijing (CN); Dongni Liu, Beijing (CN); Lei Wang, Beijing (CN); Pengcheng Lu, Beijing (CN); Jie Fu, Beijing (CN); Han Yue, Beijing (CN); Li Xiao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 463 days.

(21) Appl. No.: 15/758,127

(22) PCT Filed: Jun. 5, 2017

(86) PCT No.: PCT/CN2017/087181
§ 371 (c)(1),
(2) Date: Mar. 7, 2018

(87) PCT Pub. No.: WO2018/086342
PCT Pub. Date: May 17, 2018

(65) Prior Publication Data
US 2020/0228744 A1 Jul. 16, 2020

(30) Foreign Application Priority Data
Nov. 9, 2016 (CN) .......................... 201610985469.4

(51) Int. Cl.
*H04N 5/3745* (2011.01)
*H04N 5/351* (2011.01)
*H04N 5/378* (2011.01)

(52) U.S. Cl.
CPC ......... *H04N 5/37452* (2013.01); *H04N 5/351* (2013.01); *H04N 5/378* (2013.01)

(58) Field of Classification Search
CPC ..... H04N 5/37452; H04N 5/378; H04N 5/351
See application file for complete search history.

(56) References Cited

U.S. PATENT DOCUMENTS 6,449,014 B1    9/2002   Throngnumchai
6,713,748 B1 *   3/2004   Tsutsumi ............ H01L 27/1214
                                                   250/208.1
(Continued)

FOREIGN PATENT DOCUMENTS

CN        1645460 A    7/2005
CN      101515594 A    8/2009
(Continued)

OTHER PUBLICATIONS

Aug. 30, 2017—(WO) International Search Report and Written Opinion Appn PCT/CN2017/087181 with English Translation.

*Primary Examiner* — Lin Ye
*Assistant Examiner* — John H. Morehead, III
(74) *Attorney, Agent, or Firm* — Banner & Witcoff, Ltd.

(57) ABSTRACT

A pixel sensing circuit and driving method therefor, an image sensor, and an electronic device are provided. The pixel sensing circuit includes a photoelectric conversion element configured to generate electric charges in response to incident light, a transmission element configured to output the electric charges generated by the photoelectric conversion element, and a source follower circuit configured to compensate an output current of the transmission element. The source follower circuit includes a first source follower transistor, a second source follower transistor, and a first storage capacitor.

18 Claims, 5 Drawing Sheets

(56) References Cited

U.S. PATENT DOCUMENTS

| | | | |
|---|---|---|---|
| 7,349,018 B2* | 3/2008 | Doering | H01L 27/14609 250/208.1 |
| 2001/0015404 A1* | 8/2001 | Takada | H04N 5/35509 250/208.1 |
| 2002/0001038 A1* | 1/2002 | Lee | H04N 5/3575 348/308 |
| 2004/0178849 A1* | 9/2004 | Kimura | G11C 27/026 330/253 |
| 2005/0094222 A1* | 5/2005 | Tseng | H04N 1/1933 358/483 |
| 2005/0116907 A1 | 6/2005 | Miyazawa | |
| 2006/0170794 A1* | 8/2006 | Higuchi | H04N 5/363 348/241 |
| 2007/0216564 A1* | 9/2007 | Koseki | H04N 5/374 341/155 |
| 2009/0059047 A1* | 3/2009 | Murata | H04N 5/37452 348/297 |
| 2010/0091162 A1 | 4/2010 | Chuang et al. | |
| 2010/0289936 A1* | 11/2010 | Kimura | H03K 19/018521 348/308 |
| 2015/0333099 A1* | 11/2015 | Lyu | H01L 27/14647 257/432 |
| 2016/0148036 A1 | 5/2016 | Kim et al. | |

FOREIGN PATENT DOCUMENTS

| | | |
|---|---|---|
| CN | 101621068 A | 1/2010 |
| CN | 105556538 A | 5/2016 |
| JP | 4102098 B2 | 6/2008 |

\* cited by examiner

PIXEL SENSING CIRCUIT AND DRIVING METHOD THEREFOR, IMAGE SENSOR, AND ELECTRONIC DEVICE

The application is a U.S. National Phase Entry of International Application No. PCT/CN2017/087181 filed on Jun. 5, 2017, designating the United States of America and claiming priority to Chinese Patent Application No. 201610985469.4, filed Nov. 9, 2016. The present application claims priority to and the benefit of the above-identified applications and the above-identified applications are incorporated by reference herein in their entirety.

TECHNICAL FIELD

Embodiments of the present disclosure relate to a pixel sensing circuit and driving method therefor, an image sensor, and an electronic device.

BACKGROUND

Active pixel sensor (APS) is used to convert light image into electrical signals, and is widely used in digital camera, mobile phone with camera, vision system, and so on. Active pixel sensors can be divided into Charge Coupled Device (CCD) type and Complementary Metal Oxide Semiconductor (CMOS) type. A CMOS-type APS can be manufactured on a silicon substrate through a semiconductor manufacturing process, thus the CMOS-type APS can be easily integrated with a peripheral system having an amplifier circuit and a signal processing module. Compared with a CCD-type APS, a CMOS-type APS has lower manufacturing costs, higher processing speed and lower power consumption.

SUMMARY

An embodiment of the present disclosure provides a pixel sensing circuit, comprising: a photoelectric conversion element configured to generate electric charges in response to incident light; a transmission element configured to output the electric charges generated by the photoelectric conversion element; and a source follower circuit configured to compensate an output current of the transmission element. The source follower circuit comprises a first source follower transistor, a second source follower transistor and a first storage capacitor, the first source follower transistor and the second source follower transistor have threshold voltages equal to each other, a gate electrode of the first source follower transistor, an output terminal of the first source follower transistor, a gate electrode of the second source follower transistor, and a first end of the first storage capacitor are all coupled to a first node, and a second end of the first storage capacitor and an input terminal of the second source follower transistor are coupled to a supply voltage line.

For example, the pixel sensing circuit provided by an embodiment of the present disclosure further comprises a readout element, the readout element is configured to transmit an output current of the source follower circuit to an external circuit in response to a selection signal, and an output terminal of the second source follower transistor is coupled to an input terminal of the readout element.

For example, the pixel sensing circuit provided by an embodiment of the present disclosure further comprises a first reset element, the first reset element is configured to reset a voltage at an output node of the photoelectric conversion element, and the output node is coupled to an input terminal of the transmission element.

For example, the pixel sensing circuit provided by an embodiment of the present disclosure further comprises a switching element, and the switching element is coupled between the output node and the photoelectric conversion element.

For example, the pixel sensing circuit provided by an embodiment of the present disclosure further comprises a second photoelectric conversion element which is configured to generate electric charges in response to the incident light and a second switching element, and the second switching element is coupled between the output node and the second photoelectric conversion element.

For example, the pixel sensing circuit provided by an embodiment of the present disclosure further comprises a second storage capacitor, a first end of the second storage capacitor is coupled to the output node, and a second end of the second storage capacitor is coupled to ground or a common voltage.

For example, the pixel sensing circuit provided by an embodiment of the present disclosure further comprises a second reset element, and the second reset element is configured to reset a voltage of the first node.

For example, in the pixel sensing circuit provided by an embodiment of the present disclosure, the first reset element and the second reset element are coupled to a same reset signal line.

For example, in the pixel sensing circuit provided by an embodiment of the present disclosure, the transmission element, the switching element, the first reset element or the second reset element comprises transistors.

For example, in the pixel sensing circuit provided by an embodiment of the present disclosure, the transistors are N-type transistors or P-type transistors.

For example, in the pixel sensing circuit provided by an embodiment of the present disclosure, the photoelectric conversion element comprises a photodiode.

Another embodiment of the present disclosure provides an image sensor, comprising a plurality of pixel units arranged in an array, and at least one pixel unit comprising any one of the pixel sensing circuits described above.

For example, the image sensor provided by an embodiment of the present disclosure is prepared on a silicon substrate.

Further another embodiment of the present disclosure provides an electronic device, comprising the image sensor described above.

Still further another embodiment of the present disclosure provides a driving method for the pixel sensing circuit described above, comprising: generating the electric charges in response to the incident light by the photoelectric conversion element; outputting the electric charges generated by the photoelectric conversion element to the source follower circuit by the transmission element; and compensating the output current of the transmission element by the source follower circuit.

For example, the pixel sensing circuit provided by an embodiment of the present disclosure further comprises a readout element, and an output terminal of the second source follower transistor is coupled to an input terminal of the readout element. Accordingly, the method further comprises: transmitting an output current of the source follower circuit to an external circuit in response to a selection signal by the readout element.

For example, the pixel sensing circuit provided by an embodiment of the present disclosure further comprises a first reset element, and an output node is coupled to an input terminal of the transmission element. Accordingly, the method further comprises: resetting a voltage at the output node of the photoelectric conversion element by the first reset element before generating the electric charges in response to the incident light by the photoelectric conversion element.

For example, the pixel sensing circuit provided by an embodiment of the present disclosure further comprises a switching element and a second storage capacitor, the switching element is coupled between the output node and the photoelectric conversion element, a first end of the second storage capacitor is coupled to the output node, and a second end of the second storage capacitor is coupled to ground or a common voltage. Accordingly, the method further comprises: turning on the switching element, storing the electric charges in the second storage capacitor, and then outputting the electric charges generated by the photoelectric conversion element to the source follower circuit by the transmission element after generating the electric charges in response to the incident light by the photoelectric conversion element.

For example, the pixel sensing circuit provided by an embodiment of the present disclosure further comprises a second reset element. Accordingly, the method further comprises: resetting a voltage of the first node by the second reset element before outputting the electric charges generated by the photoelectric conversion element to the source follower circuit by the transmission element.

For example, in the driving method for the pixel sensing circuit provided by an embodiment of the present disclosure, resetting of the voltage at the output node of the photoelectric conversion element by the first reset element and resetting of the voltage of the first node by the second reset element are performed by a same reset signal.

BRIEF DESCRIPTION OF THE DRAWINGS

In order to clearly illustrate the technical solution of the embodiments of the disclosure, the drawings of the embodiments will be briefly described in the following. It is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
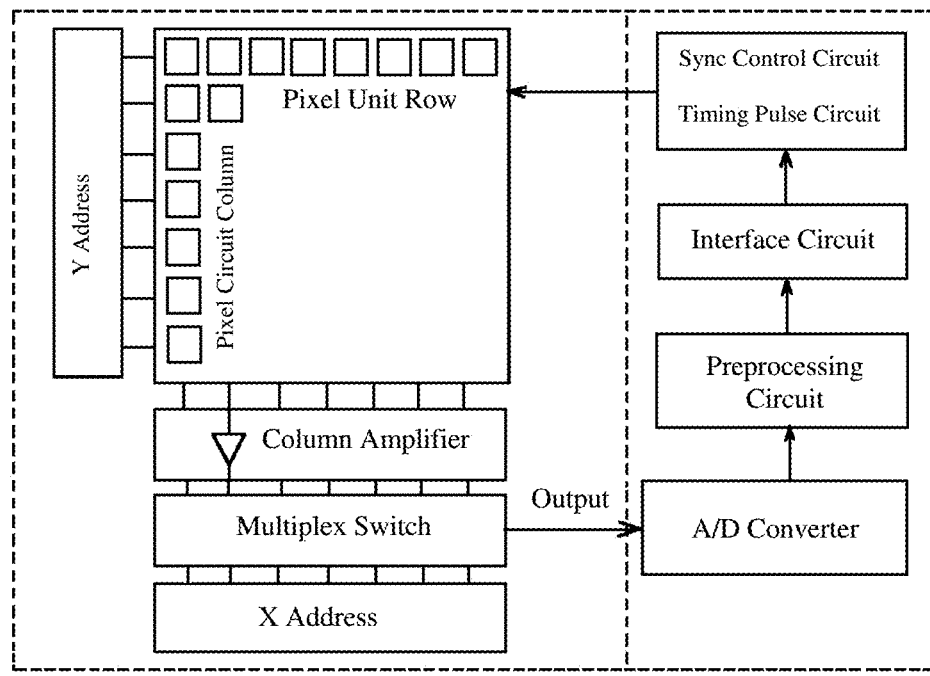
FIG. 1 is a schematic block diagram illustrating a CMOS image sensor.

FIG. 1 is a schematic block diagram illustrating a CMOS image sensor. As shown in FIG. 1, the CMOS image sensor comprises a pixel unit array and a peripheral circuit, which, for example, can be integrated on a same silicon-based chip. The pixel unit array comprises pixel units arranged in an array. As shown in the drawing, the pixel unit array is arranged in a rectangle array in X and Y directions, and each of the pixel units in the rectangle array has its address in both the X and Y directions (for example, row and column directions) and can be selected by an address decoder in the two directions respectively via a corresponding row line and a corresponding column line. Output current/voltage signals are amplified, and then sent to an A/D converter for analog-digital conversion into digital signals for output.

Each of the pixel units of the above CMOS image sensor comprises an active pixel sensing circuit, and the active pixel sensing circuit may generally have a three-transistor configuration and a four-transistor configuration. In the four-transistor configuration, the CMOS active pixel sensor comprises a photodiode and four MOS transistors; and photogenerated charges that are produced and collected on the photodiode are sensed under a control of the four MOS transistors. In the three-transistor configuration, the CMOS active pixel sensor comprises a photodiode and three MOS transistors; and photogenerated charges that are produced and collected on the photodiode are sensed under a control of the three MOS transistors.

Figure 2:
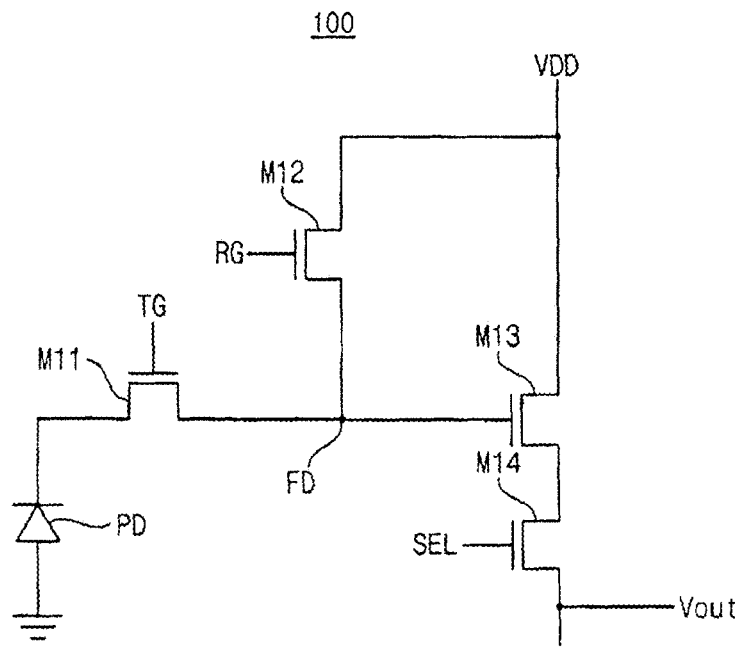
FIG. 2 is a circuit diagram illustrating a CMOS active pixel sensing circuit with a four-transistor configuration.

FIG. 2 is a circuit diagram illustrating a CMOS active pixel sensing circuit with a four-transistor configuration. Referring to FIG. 2, the CMOS active pixel sensing circuit 100 comprises a photodiode PD, a transmission transistor M11, a reset transistor M12, a source follower transistor M13 and a selection transistor M14.

When the gate voltage RG of the reset transistor M12 increases and the reset transistor M12 turns on, the electric potential of a sensing node (i.e., floating diffusion node FD) increases until it becomes equal to the level of a supply voltage VDD. The source follower transistor M13 and the selection transistor M14 sample the electric potential of the floating diffusion node FD, and the sampled electric potential is a reference electric potential.

During a light sensing accumulation phase period, when light is incident on the photodiode PD, electron-hole pairs (EHP) are generated in response to the incident light. When the gate voltage TG of the transmission transistor M11 increases after the light sensing accumulation phase ends, electric charges accumulated (or stored) in the photodiode PD are transmitted to the floating diffusion node FD. When the electric potential of the floating diffusion node FD that is substantially proportional to the quantity of the transmitted electric charges decreases observably, the source electric potential of the source follower transistor M13 changes. When the gate voltage SEL of the selection transistor M14 increases, the selection transistor M14 turns on, and the source voltage of the source follower transistor M13 is output as an output voltage Vout. Light sensing is accomplished by measuring the difference between the reference electric potential and the output voltage Vout. After that, the reset operation and so on are repeated.

Figure 3:
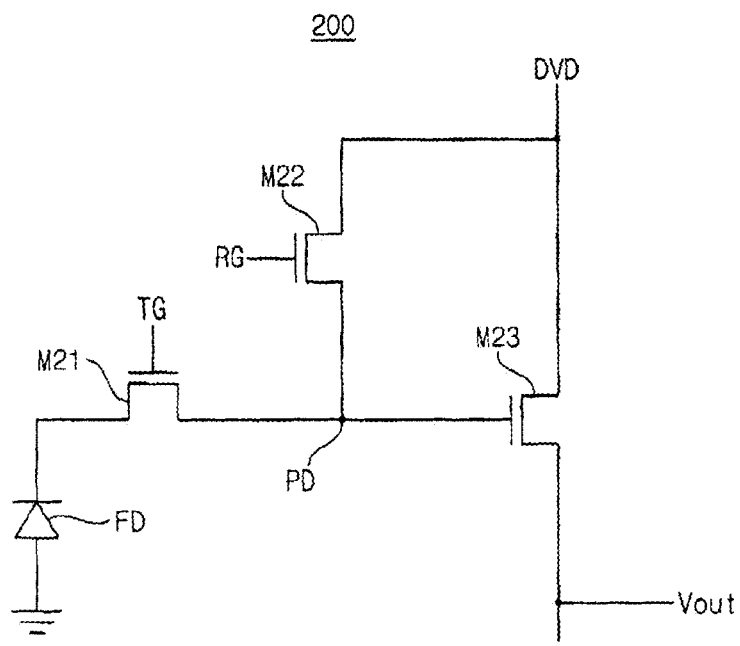
FIG. 3 is a circuit diagram illustrating a CMOS active pixel sensing circuit with a three-transistor configuration.

FIG. 3 is a circuit diagram illustrating a CMOS active pixel sensing circuit with a three-transistor configuration. Referring to FIG. 3, the CMOS active pixel sensing circuit 200 comprises a photodiode PD, a transmission transistor M21, a reset transistor M22 and a source follower transistor M23. The CMOS active pixel sensing circuit 200 with the three-transistor configuration may not comprise the selection transistor M14 as shown in FIG. 2, and, for example, a dynamic voltage source voltage DVD is employed.

When the gate voltage RG of the reset transistor M22 increases and the reset transistor M22 turns on while the dynamic voltage source voltage DVD has a high supply voltage, the electric potential of the sensing node (i.e., floating diffusion node FD) increases to the level of a high supply voltage. The source follower transistor M23 samples the electric potential of the floating diffusion node FD and outputs the sampled electric potential to an external circuit. The sampled electric potential is a reference electric potential. After that, the dynamic voltage source voltage DVD is reduced to a low supply voltage.

During light sensing accumulation phase period, when light is incident on the photodiode PD, electron-hole pairs (EHP) are generated in response to the incident light. When the gate voltage TG of the transmission transistor M21 increases after the light accumulation phase, electric charges accumulated (or stored) in the photodiode PD are transmitted to the floating diffusion node FD. When the electric potential of the floating diffusion node FD that is substantially proportional to the quantity of the transmitted electric charges decreases, and the dynamic voltage source voltage DVD has a high supply voltage, and the source voltage of the source follower transistor M23 changes. The source voltage of the source follower transistor M23 is output to an external circuit as an output voltage Vout. After that, the reset operation and so on is repeated as shown in FIG. 2. The active pixel sensing circuit senses a signal based on the electric potential change of the floating diffusion node FD, i.e., light sensing is accomplished by measuring the difference between the reference electric potential and the output voltage Vout.

However, in the manufacturing process of semiconductor manufacturing process on the silicon substrate, there may be incurred device fluctuation as to the source followers in the active pixel sensing circuits in different pixel units due to heterogeneity of raw materials, process conditions, etc., so there is produced difference between the current amount that is finally sensed and the current amount that is generated by the actual light irradiation, and thus there is distortion of the captured image.

At least one embodiment of the present disclosure provides a pixel sensing circuit and a driving method therefor, and also provides an image sensor with the pixel sensing circuit. By a redesigned circuit, the pixel sensing circuit eliminates the problem that output currents are not uniform due to the source followers' variations.

An embodiment of the present disclosure provides a pixel sensing circuit, comprising: a photoelectric conversion element configured to generate electric charges in response to incident light; a transmission element configured to output the electric charges generated by the photoelectric conversion element; and a source follower circuit configured to compensate an output current of the transmission element. The source follower circuit comprises a first source follower transistor, a second source follower transistor and a first storage capacitor, the first source follower transistor and the second source follower transistor have threshold voltages equal to each other, a gate electrode of the first source follower transistor, an output terminal of the first source follower transistor, a gate electrode of the second source follower transistor, and a first end of the first storage capacitor are all coupled to a first node, and a second end of the first storage capacitor and an input terminal of the second source follower transistor are coupled to a supply voltage line.

Another embodiment of the present disclosure provides a driving method for the pixel sensing circuit described above, comprising: generating electric charges in response to incident light by the photoelectric conversion element; outputting the electric charges generated by the photoelectric conversion element to the source follower circuit by the transmission element; and compensating the output current of the transmission element by the source follower circuit.

As known by those skilled in the art, the transistors may be N-type transistors or P-type transistors. In the embodiments of the present disclosure, for N-type transistors, the (current) input terminal is a drain electrode and the output terminal is a source electrode; for P-type transistors, the (current) input terminal is a source electrode and the output terminal is a drain electrode.

In the following description of the present disclosure, P-type transistors (for example, P-type MOS transistors) are described as an example. However, those skilled in the art should know that any one of them may be implemented using an N-type transistor (for example, an N-type MOS transistor).

Figure 4:
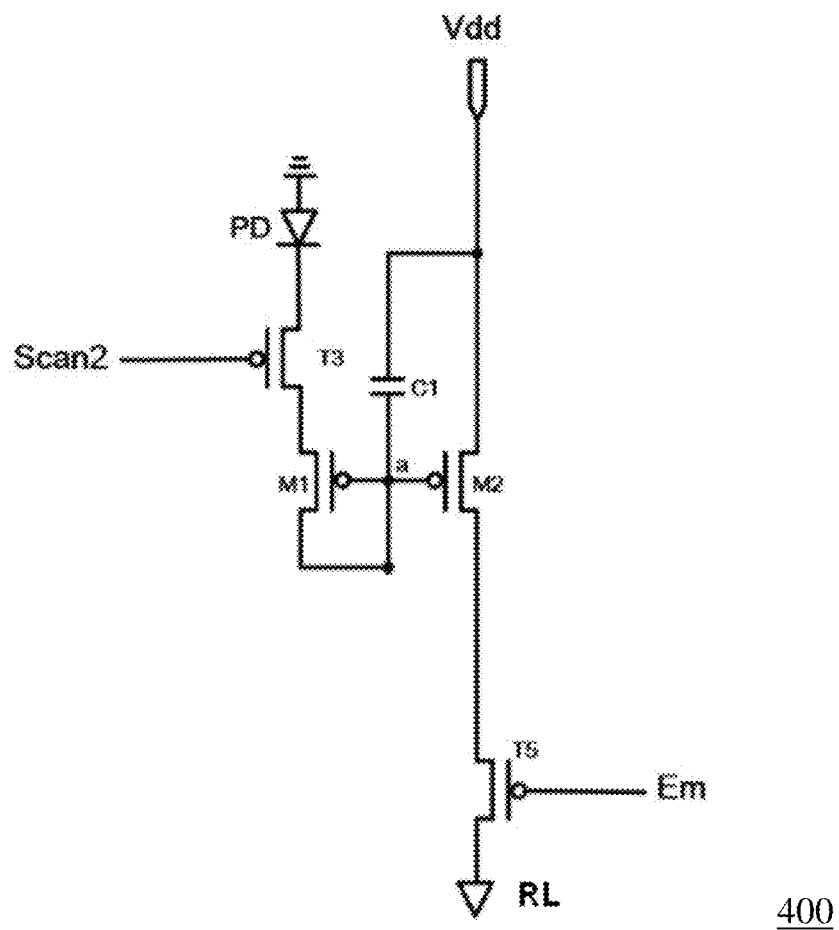
FIG. 4 is a schematic diagram of a pixel sensing circuit provided by an embodiment of the present disclosure.

FIG. 4 is a schematic diagram of a pixel sensing circuit provided by an embodiment of the present disclosure. As shown in FIG. 4, the pixel sensing circuit is an active pixel sensing circuit 400, comprising: a photodiode PD, a transmission transistor T3, and a source follower circuit. The photodiode PD serves as a photoelectric conversion element which generates electric charges in response to incident light; the transmission transistor T3 serves as a transmission element which outputs the electric charges generated by the photodiode; and the source follower circuit is configured to compensate an output current of the transmission transistor T3.

The source follower circuit comprises a first source follower transistor M1, a second source follower transistor M2 and a first storage capacitor C1. The first source follower transistor M1 and the second source follower transistor M2 have threshold voltages (Vth) equal to each other, a gate electrode of the first source follower transistor M1, a drain electrode of the first source follower transistor M1, a gate electrode of the second source follower transistor M2, and a first end of the first storage capacitor C1 are all coupled to a first node a, and a second end of the first storage capacitor C1 and a source electrode of the second source follower transistor M2 are coupled to a supply voltage line Vdd.

The transmission transistor T3 is disposed between the photodiode PD and the source follower circuit. As shown in the figure, the anode of the photodiode PD is connected to, for example, ground or a common voltage, and the cathode of the photodiode is connected to a source electrode of the transmission transistor T3. A drain electrode of the transmission transistor T3 is coupled to a source electrode of the first source follower transistor M1, and a gate electrode of the transmission transistor T3 is coupled to a second scan line Scan2.

The active pixel sensing circuit may further comprise a readout element. For example, the readout element is configured to transmit an output current of the source follower circuit to an external circuit in response to a selection signal, and an output terminal of the second source follower transistor is coupled to an input terminal of the readout element.

Specifically, as shown in FIG. 4, the active pixel sensing circuit comprises a readout transistor T5 serving as a readout element and coupled between a drain electrode of the second source follower transistor M2 and a readout line RL (e.g., a column line), and a gate electrode of the readout transistor T5 is connected to a selection signal line EM (e.g., a row line).

The first source follower transistor M1 and the second source follower transistor M2 have threshold voltages (Vth) equal to each other, but the values of the threshold voltages not required to be exactly equal. For example, they may be substantially equal. For example, the difference between them is within 5%, preferably within 3%. Factors that affect the threshold voltage of a transistor comprise the material and the thickness of a gate insulating layer, the material and the doping content of an active layer, the operating temperature and so on. In order for the first source follower transistor M1 and the second source follower transistor M2 to have threshold voltages (Vth) equal to each other, the first source follower transistor M1 and the second source follower transistor M2 may be of the same type, and for example, when preparing the first source follower transistor M1 and the second source follower transistor M2, both of them are prepared as close as possible and the same preparation parameters (comprising the thickness of a gate insulating layer, the thickness of an active layer, the breadth length ratio (W/L) of a channel region, and so on) are adopted, but the embodiments of the present disclosure are not limited thereto. In the schematic diagram of FIG. 4, the first source follower transistor M1 and the second source follower transistor M2 are oppositely disposed, and the threshold voltages of both are equal to each other, so they can be regarded disposed in a symmetrical arrangement (or a mirror arrangement).

As described above, in the embodiment as illustrated in FIG. 4, the transmission transistor T3, the first source follower transistor M1, the second source follower transistor M2, and the readout transistor T5 are all P-type transistors. The photodiode PD serves as an example of the photoelectric conversion element, but the embodiments of the present disclosure are not limited thereto.

The driving method for the active pixel sensing circuit 400 according to the embodiment as shown in FIG. 4 may comprise a photoelectric conversion phase, an electric discharging phase, and a signal readout phase.

First of all, during the photoelectric conversion phase, when incident light is irradiated onto the photodiode PD, light quantum excites at the PN junction of the photodiode to generate electron-hole pairs, thereby the photodiode PD performs photoelectric conversion in response to the incident light to generate electric charges that accumulate on the photodiode PD, and a data voltage Vdata is generated.

Next, during the electric discharging phase, the electric charges generated by the photodiode are output to the source follower circuit by the transmission transistor T3. Specifically, a low level signal is applied to the second scan line Scan2, the transmission transistor T3 turns on, and the first source follower transistor M1 also turns on. Thereby the first node a is charged through the first source follower transistor M1 until a voltage of $V_{data}-V_{tH1}$. $V_{data}$ is the data voltage generated by the photodiode PD, and $V_{th1}$ is the threshold voltage of the first source follower transistor M1, and this voltage is stored in the first storage capacitor C1.

Then, during the signal readout phase, the output current of the transmission transistor is compensated by the source follower circuit and then the output current of the source follower circuit is transmitted to the external circuit by the readout transistor T5 in response to the selection signal EM. Specifically, a low level signal is applied to the selection signal line EM, the readout transistor T5 turns on, the source electrode of the second source follower transistor M2 is connected to the supply voltage Vdd, and an electrical current Iout flows out through the second source follower transistor M2 and the readout transistor T5 and is then transmitted to the external circuit for further processing such as amplification, analog/digital conversion, and so on.

Based on the saturation current formula of a transistor, the current flowing through the second source follower transistor M2 is:

$$Iout = K(V_{GS} - V_{th2})^2$$
$$= K[V_{dd} - (V_{data} - V_{th1}) - V_{th2}]^2$$
$$= K(V_{dd} - V_{data})^2$$

$V_{GS}$ in the above formula is a voltage difference between the gate electrode and the source electrode of the transistor M2, $V_{dd}$ is the supply voltage, $V_{th2}$ is the threshold voltage of the second source follower transistor M2, and the threshold voltage $V_{th1}$ is equal to $V_{th2}$, i.e., $V_{th1}=V_{th2}$. In addition, $V_{GS}=V_{dd}-(V_{data}-V_{th1})$.

It can be seen from the above formula that in this case the output current Iout is not affected any more by the threshold voltage Vth1 or Vth2 of the source follower transistor M1 or M2, and is only related to the supply voltage Vdd and the data voltage Vdata. The data voltage Vdata is directly generated by the PN junction of the photodiode PD due to the illumination of the incident light. This solves the problem that the threshold voltage (Vth) of the source follower transistor drifts due to the manufacturing process and long-term operation, so as to ensure the accuracy of signal data.

Based on the embodiment shown in FIG. 4, other embodiments can be obtained by incorporating other circuits. For example, the active pixel sensing circuit shown in FIG. 4 may further comprise a first reset element configured to reset a voltage at an output node (for example, this output node may correspond to the node between an input terminal of the transmission transistor T3 and the cathode of the photodiode PD in FIG. 4) of the photodiode. The output node is coupled to the input terminal of the transmission transistor, and the first reset element may be a reset transistor.

Alternatively, for example, the active pixel sensing circuit shown in FIG. 4 may further comprise a second reset element configured to reset a voltage of the first node a, and the second reset element may also be a reset transistor. The first reset element and the second reset element described above do not necessarily have to be incorporated simultaneously.

Alternatively, for example, the active pixel sensing circuit shown in FIG. 4 may further comprise a switching element and a second storage capacitor. The switching element is coupled between the output node and the photodiode, a first end of the second storage capacitor is coupled to the output node, and a second end of the second storage capacitor is coupled to ground or a common voltage. Thereby, the voltage generated by the photodiode can be selectively buffered.

Figure 5:
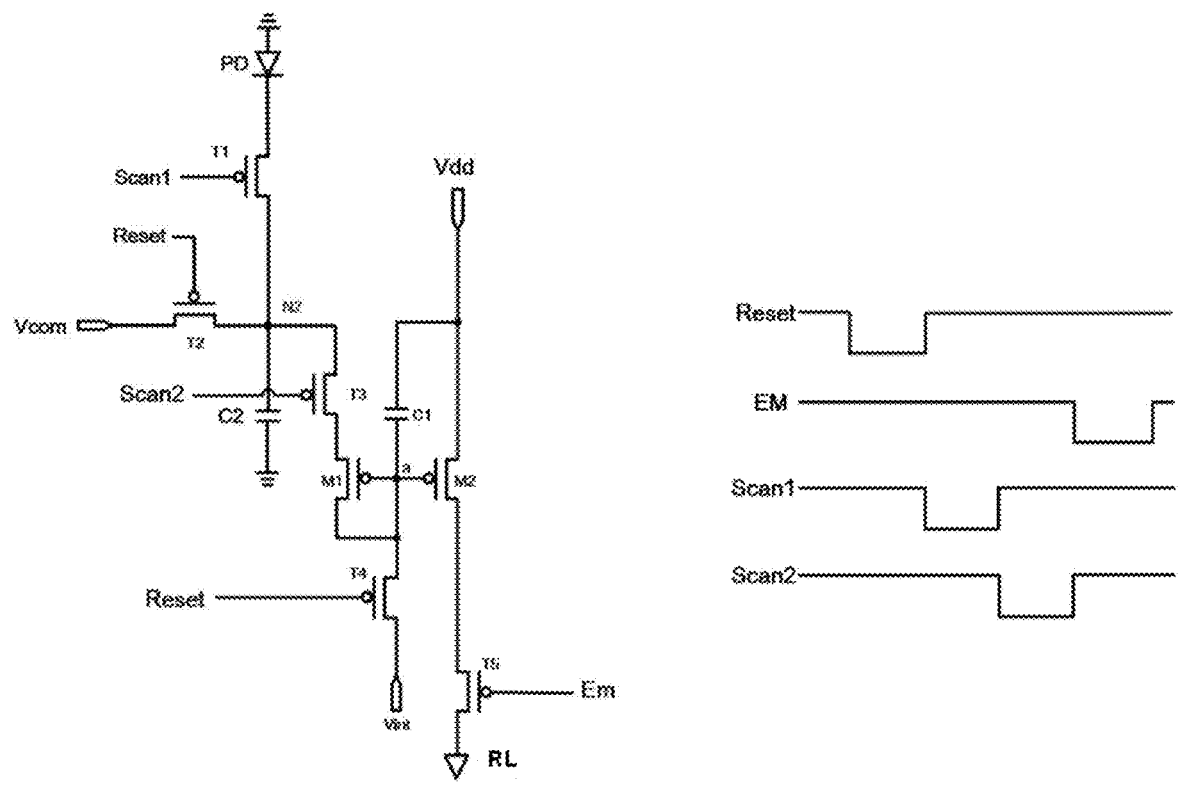
FIG. 5 is a schematic diagram of a pixel sensing circuit provided by another embodiment of the present disclosure.

FIG. 5 is a schematic diagram of a pixel sensing circuit provided by another embodiment of the present disclosure. As shown in FIG. 5, compared with the embodiment shown in FIG. 4, the pixel sensing circuit is an active pixel sensing circuit 500, which further comprises a switching transistor T1, a first reset transistor T2, a second storage capacitor C2, and a second reset transistor T4, in addition to the photodiode PD, the transmission transistor T3, the source follower circuit, and the output transistor T5.

The first reset transistor T2 serves as a first reset element configured to reset the voltage of an output node N2 of the photodiode. The output node N2 is coupled to the input terminal of the transmission element, i.e., the source electrode of the transmission transistor T3. As illustrated in FIG. 5, a control terminal of the first reset transistor T2 is connected to a reset line Reset, a terminal of this transistor is coupled to the output node N2, and another terminal thereof is coupled to a common voltage Vcom.

The switching transistor T1 serves as a switching element configured to control whether or not to output the data voltage generated by the photodiode PD in response to the incident light. The switching transistor T1 is coupled between the output node N2 and the photodiode PD. As shown in FIG. 5, a gate electrode of the switch transistor T1 is connected to a first scan line Scan1, a source electrode of the switch transistor T1 is coupled to the cathode of the photodiode PD, and a drain electrode of the switch transistor T1 is coupled to the output node N2.

A first end of the second storage capacitor C2 is coupled to the output node N2, and a second end of the second storage capacitor C2 is coupled to ground or a common voltage. The second storage capacitor C2 may be configured to store the voltage of the output node N2.

The second reset transistor T4 serves as a second reset element configured to reset the voltage of the first node a. As shown in FIG. 5, a control terminal of the second reset transistor T4 is connected to the reset line Reset, a terminal of this transistor is coupled to the first node a, and another terminal is coupled to an initial voltage Vint. The first reset transistor T2 and the second reset transistor T4 may be coupled to the same reset line Reset, or may be connected to different reset lines Reset and both are applied with reset signals in synchronization.

As shown in FIG. 5, the switching transistor T1, the first reset transistor T2, the second storage capacitor C2, and the second reset transistor T4 may be P-type transistors (for example, P-type MOS transistors); similarly, those skilled in the art would know that any one of them may be an N-type transistor (for example, an N-type MOS transistor).

The right side of FIG. 5 shows the timing diagrams of the reset signal Reset, the selection signal EM, the first scan signal Scan1, and the second scan signal Scan2. The driving method for the active pixel sensing circuit according to the embodiment as shown in FIG. 5 is described below in connection with the timing diagram and FIGS. 6A-6D. The driving method for the active pixel sensing circuit according to the embodiment as shown in FIG. 5 may comprise a reset phase, a photoelectric conversion phase, an electric discharging phase, and a signal readout phase.

Figure 6A:
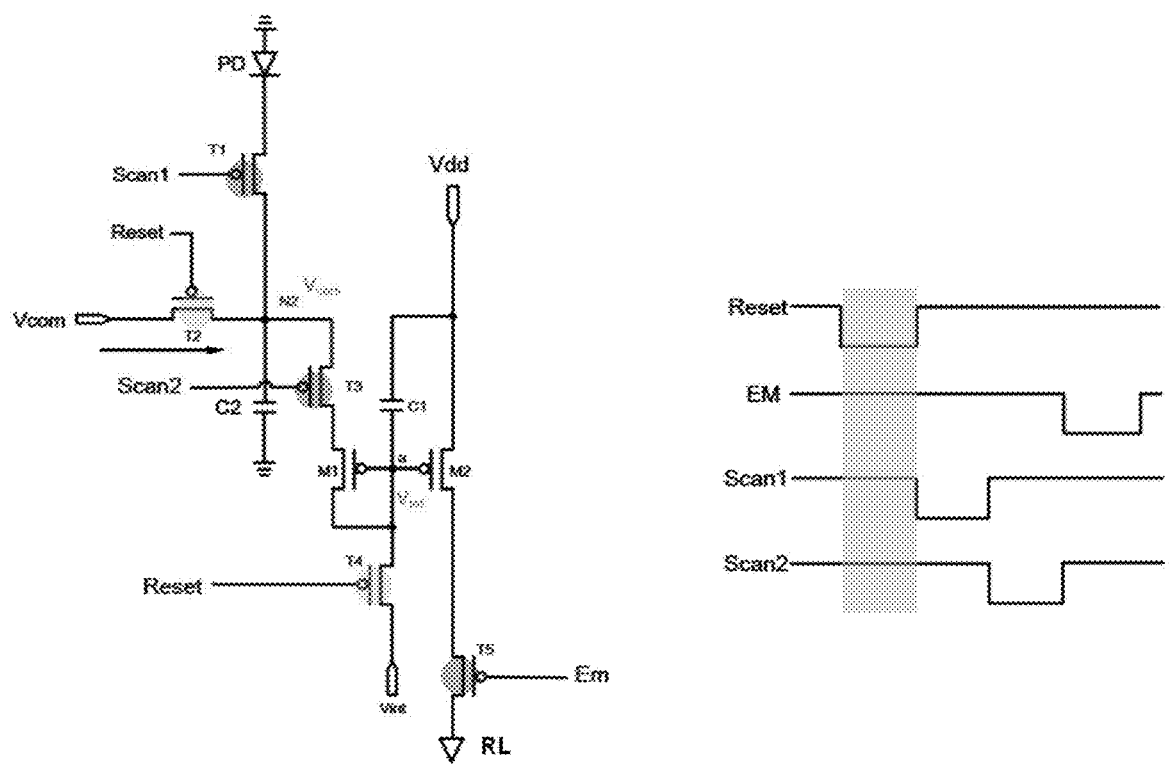
FIG. 6A to FIG. 6D are schematic diagrams of operating processes of the pixel sensing circuit as illustrated in FIG. 5.

First of all, during the reset phase, as shown in the timing diagrams on the right side of FIG. 6A, the reset signal Reset changes to a low level, and the selection signal EM, the first scan signal Scan1 and the second scan signal Scan2 are kept at high levels, corresponding to the shaded portion of the timing diagram. At this time, the first reset transistor T2 and the second reset transistor T4 turn on and respectively reset the voltages of the output node N2 and the first node a to the common voltage Vcom and the initial voltage Vint, while the other transistors T1, T3, and T5 are in turning-off states. The initial voltage Vint is a low voltage signal, so that the first source follower transistor M1 and the second source follower transistor M2 are in turning-on states. However, because the readout transistor T5 is in a turning-off state, there is no signal readout that occurs.

Figure 6B:
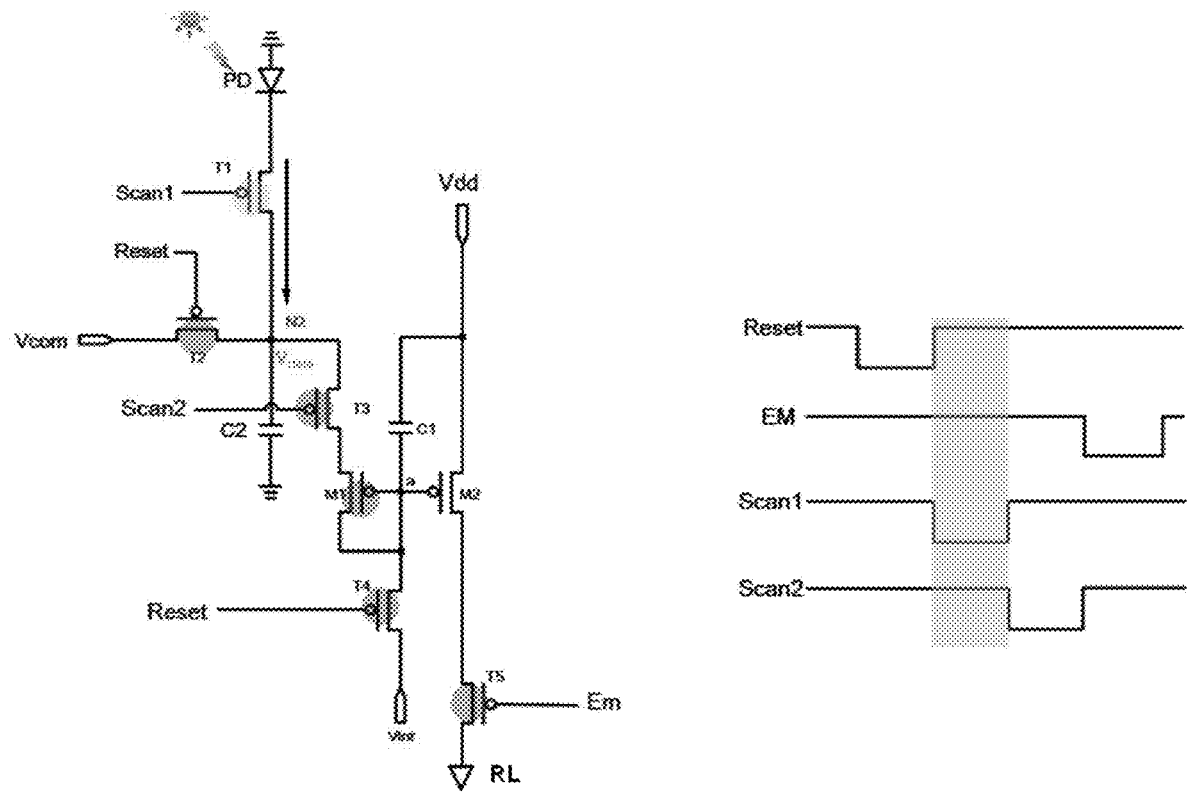
Figure 6C:
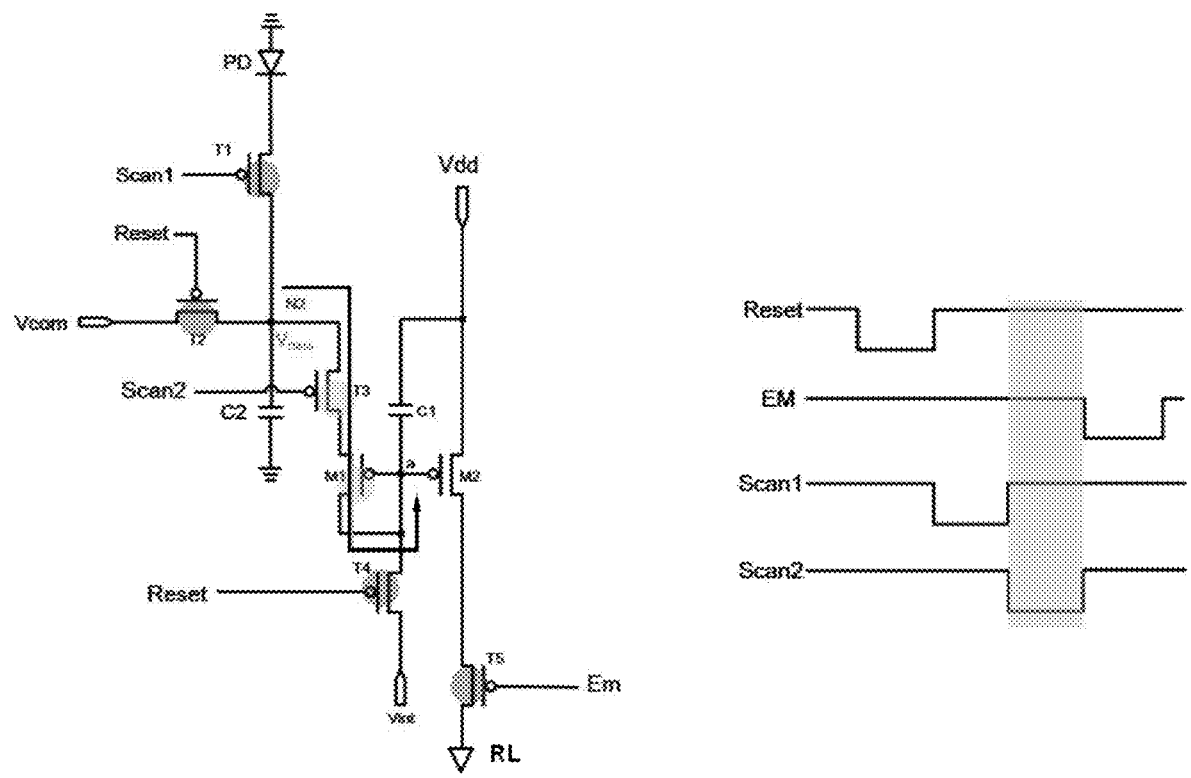
Figure 6D:
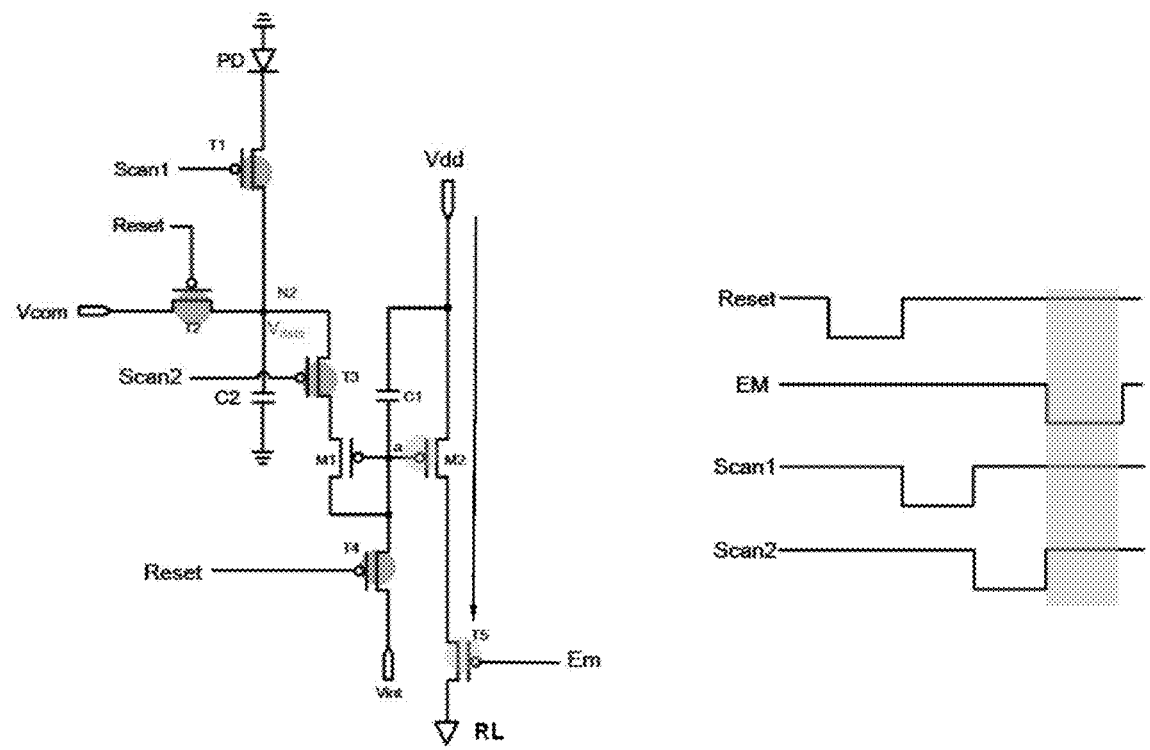

Secondly, during the photoelectric conversion phase, as shown in the timing diagrams on the right side of FIG. 6B, when incident light is irradiated onto the photodiode PD, light quantum excites at the PN junction of the photodiode to generate electron-hole pairs, thereby the photodiode PD performs photoelectric conversion in response to the incident light to generate electric charges that accumulate on the photodiode PD to generate a voltage. At this time, the reset signal Reset changes to a high level, and the selection signal EM and the second scan signal Scan2 are kept at high levels, while the first scan signal Scan1 changes to a low level. Thereby the switching transistor T1 turns on while the other transistors T2, T3, T4, and T5 are in turning-off states. Thus, the electric potential of the output node N2 is the data voltage Vdata and is stored in the second storage capacitor C2.

Next, during the electric discharging phase, the electric charges generated by the photodiode are output to the source follower circuit by the transmission transistor T3. Specifically, as shown in the timing diagrams on the right side of FIG. 6C, the second scan signal Scan2 changes to a low level, while the reset signal Reset, the selection signal EM, and the first scan signal Scan1 change to high levels. The transmission transistor T3 turns on, and the first source follower transistor M1 also turns on, while the other transistors T1, T2, T4, and T5 are in turning-off states. Thereby the first node a is charged through the first source follower transistor M1 until the voltage of $V_{data}-V_{th1}$. $V_{th1}$ is the threshold voltage of the first source follower transistor M1, and this voltage is stored in the first storage capacitor C1. At this time, the second source follower transistor M2 also turns on. However, because the readout transistor T5 is in the off state, there is no signal readout that occurs.

Then, during the signal readout phase, the output current of the transmission transistor is compensated by the source follower circuit and then the output current of the source follower circuit is transmitted to the external circuit by the readout transistor T5 in response to the selection signal EM. Specifically, as shown in the timing diagrams on the right side of FIG. 6D, the selection signal EM changes to a low level, while the reset signal Reset, the first scan signal Scan1, and the second scan signal Scan2 are at high levels.

Thereby the readout transistor T5 turns on while the other transistors T1, T2, T3, and T4 are in the turning-off states. When the source electrode of the second source follower transistor M2 is connected to the supply voltage and the second source follower transistor M2 maintains the turning-on state under a control of the voltage of the first node a, the current Iout flows out through the second source follower transistor M2 and the readout transistor T5 and is then transmitted to the external circuit for further processing such as amplification, analog/digital conversion, and so on.

Based on the saturation current formula of the transistor, the current flowing through the second source follower transistor M2 is:

$$Iout = K(V_{GS} - V_{th2})^2$$
$$= K[V_{dd} - (V_{data} - V_{th1}) - V_{th2}]^2$$
$$= K(V_{dd} - V_{data})^2$$

$V_{GS}$ in the above formula is a voltage difference between the gate electrode and the source electrode of the transistor M2, $V_{dd}$ is the supply voltage, $V_{th2}$ is the threshold voltage of the second source follower transistor M2, and the threshold voltage $V_{th1}$ is equal to $V_{th2}$, i.e., $V_{th1}=V_{th2}$. In addition, $V_{GS}=V_{dd}-(V_{data}-V_{th1})$.

It can be seen from the above formula that in this case the output current Iout here is not affected any more by the threshold voltage Vth1 or Vth2 of the source follower transistor M1 or M2, and is only related to the supply voltage Vdd and the data voltage Vdata. The data voltage Vdata is directly generated by the PN junction of the photodiode PD due to the illumination of the incident light. This solves the problem that the threshold voltage (Vth) of the source follower transistor drifts due to the manufacturing process and long-time operation, so as to ensure the accuracy of the signal data.

Figure 7:
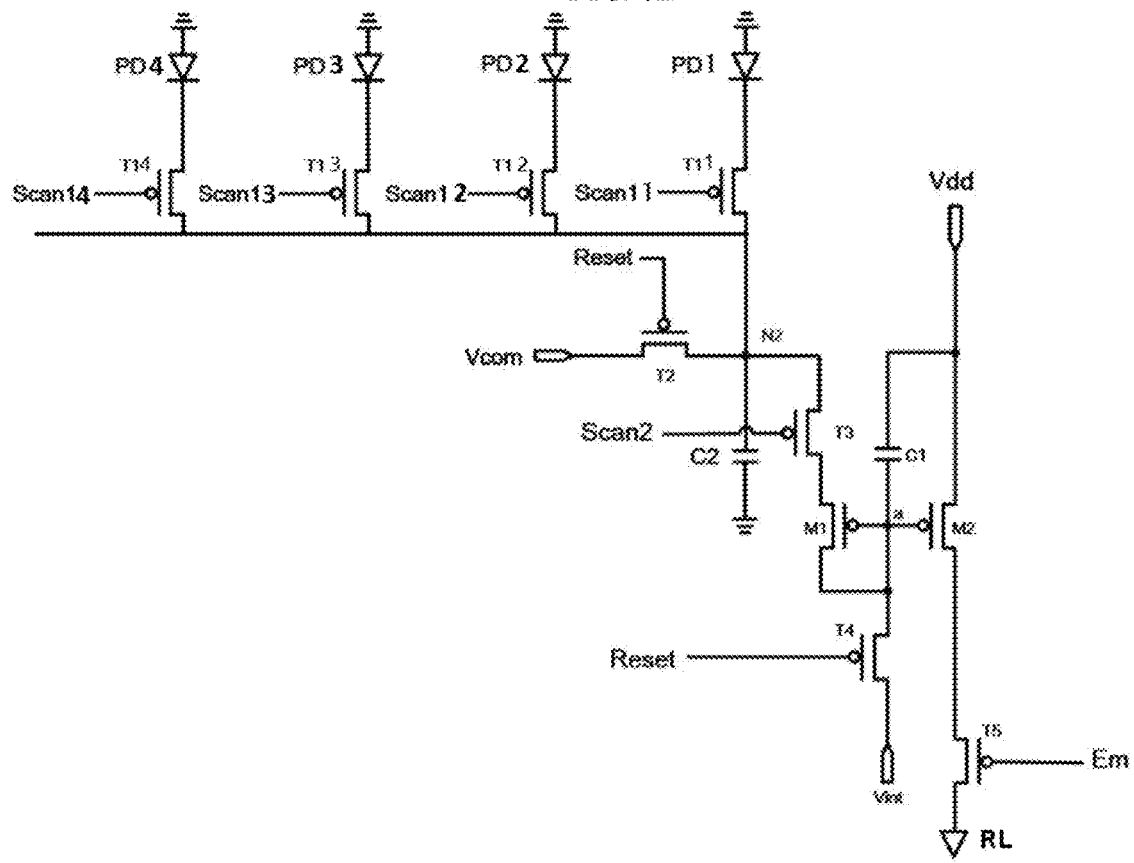
FIG. 7 is a schematic diagram of a pixel sensing circuit provided by still another embodiment of the present disclosure.

FIG. 7 is a schematic diagram of a pixel sensing circuit provided by another embodiment of the present disclosure, and shows a circuit diagram illustrating an active pixel sensing circuit with a shared structure.

Referring to FIG. 7, the pixel sensing circuit is an active pixel sensing circuit 700 with a shared structure, which can increase a pixel occupancy ratio of the pixel unit array. The pixel occupancy ratio may be defined here as a ratio of the area occupied by the photodiodes to the area occupied by other transistors such as the reset transistors, the source follower transistors, and so on.

Compared with the embodiment shown in FIG. 5, in the active pixel sensing circuit 700 with a shared structure, for example, four sets of combinations of a photodiode and a switching transistor are commonly coupled to the output node N2 and share the first reset transistor T2, the second storage capacitor C2, the transmission transistor T3, the source follower circuit (comprising the first source follower transistor M1, the second source follower transistor M2 and the first storage capacitor C1), and the readout transistor T5. The four sets of combinations of a photodiode and a switching transistor belong to four pixel units. A first pixel unit comprises a photodiode PD1 and a switching transistor T11, the switching transistor T11 being connected to a scan line Scan11; a second pixel unit comprises a photodiode PD2 and a switching transistor T12, the switching transistor T12 being connected to a scan line Scan12; a third pixel unit comprises a photodiode PD3 and a switching transistor T13, the switching transistor T13 being connected to a scan line Scan13; and a fourth pixel unit comprises a photodiode PD4 and a switching transistor T14, the switching transistor T14 being connected to a scan line Scan14.

For example, the first to the fourth sub-pixels may be sequentially scanned in four adjacent scan periods to read out electric charges generated by the photodiodes therein in response to incident light. Each of the four scan periods comprises a reset phase, a photoelectric conversion phase, an electric discharging phase, and a signal readout phase. The difference is that low level signals are respectively applied to the scan lines Scan11, Scan12, Scan13, and Scan14 to respectively read out voltages generated by the photodiodes PD1, PD2, PD3, and PD4.

Those skilled in the art can understand that the embodiments of the present disclosure are not limited to the four sets of combinations of a photodiode and a switching transistor as shown in FIG. 7, and two or more sets of combinations of a photodiode and a switching transistor may be acceptable.

An embodiment of the present disclosure also provides an image sensor, comprising a plurality of pixel units arranged in an array, and at least one pixel unit comprising any one of the pixel sensing circuits provided by an embodiment of the present disclosure. The image sensor, for example, comprises a pixel unit array of X rows and Y columns, and X row lines (selection signal lines Em) and Y column lines (readout lines RL) are prepared accordingly.

In addition to the pixel unit array, the image sensor may further comprise peripheral circuits such as a row driving circuit, a column driving circuit, an amplifying circuit, a pre-processing circuit, and so on. The pixel unit array and the peripheral circuits, for example, may be prepared on a silicon substrate by semiconductor integrated circuit manufacturing processes (e.g., CMOS integrated circuit manufacturing processes), and the silicon substrate, for example, may be a monocrystalline silicon substrate or a silicon on insulator (SOI) substrate etc.

An embodiment of the present disclosure also provides an electronic device, comprising the above image sensor provided by an embodiment of the present disclosure. The electronic device may be a digital camera, a mobile phone, a tablet computer, a laptop, or the like.

What are described above is related to the illustrative embodiments of the disclosure only and not limitative to the scope of the disclosure; the scopes of the disclosure are defined by the accompanying claims.

The application claims priority to the Chinese patent application No. 201610985469.4, filed Nov. 9, 2016, the entire disclosure of which is incorporated herein by reference as part of the present application.

What is claimed is:

1. A pixel sensing circuit, comprising:
a photoelectric conversion circuit, configured to generate electric charges in response to incident light;
a transmission circuit, configured to output the electric charges generated by the photoelectric conversion circuit, wherein an input terminal of transmission circuit is directly connected to an output node of the photoelectric conversion circuit;
a source follower circuit, configured to compensate an output current of the transmission circuit;
a first reset circuit, wherein the first reset circuit is configured to reset a voltage at the output node; and
a second storage capacitor, wherein a first end of the second storage capacitor is couple to the output node, and a second end of the second storage capacitor is coupled to ground or a common voltage, wherein the source follower circuit comprises a first source follower transistor, a second source follower transistor, and a first storage capacitor, the first source follower transistor and the second source follower transistor have threshold voltages equal to each other, a gate electrode of the first source follower transistor, an output terminal of the first source follower transistor, a gate electrode of the second source follower transistor, and a first end of the first storage capacitor are all directly connected to a first node, and a second end of the first storage capacitor and an input terminal of the second source follower transistor are directly connected to a supply voltage line.

2. The pixel sensing circuit according to claim 1, further comprising a readout circuit, wherein the readout circuit is configured to transmit an output current of the source follower circuit to an external circuit in response to a selection signal, and an output terminal of the second source follower transistor is coupled to an input terminal of the readout circuit.

3. The pixel sensing circuit according to claim 1, further comprising a switching circuit, wherein the switching circuit is coupled between the output node and the photoelectric conversion circuit.

4. The pixel sensing circuit according to claim 1 further comprising:
a second photoelectric conversion circuit, configured to generate electric charges in response to the incident light; and
a second switching circuit, coupled between the output node and the second photoelectric conversion circuit.

5. The pixel sensing circuit according to claim 1, wherein the photoelectric conversion circuit comprises a photodiode.

6. An image sensor, comprising a plurality of pixel units arranged in an array, at least one pixel unit comprising the pixel sensing circuit according to claim 1.

7. The image sensor according to claim 6, wherein the image sensor is prepared on a silicon substrate.

8. An electronic device, comprising the image sensor according to claim 6.

9. The pixel sensing circuit according to claim 3 further comprising a second reset circuit, wherein the second reset circuit is configured to reset a voltage of the first node.

10. The pixel sensing circuit according to claim 9, wherein the first reset circuit and the second reset circuit are coupled to a same reset signal line.

11. The pixel sensing circuit according to claim 9, wherein the transmission circuit, the switching circuit, the first reset circuit or the second reset circuit comprises transistors.

12. The pixel sensing circuit according to claim 11, wherein the transistors are N-type transistors or P-type transistors.

13. A driving method for a pixel sensing circuit, wherein the pixel sensing circuit comprises:
a photoelectric conversion circuit, configured to generate electric charges in response to incident light;
a transmission circuit, configured to output the electric charges generated by the photoelectric conversion circuit, wherein an input terminal of the transmission circuit is directly connected to an output node of the photoelectric conversion circuit;
a source follower circuit, configured to compensate an output current of the transmission circuit;
a first reset circuit, wherein the first reset circuit is configured to reset a voltage at the output node; and
a second storage capacitor, wherein a first end of the second storage capacitor is coupled to the output node, and a second end of the second storage capacitor is coupled to ground or a common voltage,
wherein the source follower circuit comprises a first source follower transistor, a second source follower transistor, and a first storage capacitor, the first source follower transistor and the second source follower transistor have threshold voltages equal toe ach other, a gate electrode of the first source follower transistor, an output terminal of the first source follower transistor, a gate electrode of the second source follower transistor, and a first end of the first storage capacitor are all directly connected to a first node, and a second end of the first storage capacitor and an input terminal of the second source follower transistor are directly connected to a supply voltage line,
the driving method comprising:
generating the electric charges in response to the incident light by the photoelectric conversion circuit;
outputting the electric charges generated by the photoelectric conversion circuit to the source follower circuit by the transmission circuit; and
compensating the output current of the transmission circuit by the source follower circuit.

14. The driving method according to claim 13, the pixel sensing circuit further comprising a readout circuit, an output terminal of the second source follower transistor being coupled to an input terminal of the readout circuit, the method further comprising:
transmitting an output current of the source follower circuit to an external circuit in response to a selection signal by the readout circuit.

15. The driving method according to claim 14, further comprising:
resetting a voltage at the output node by the first reset circuit before generating the electric charges in response to the incident light by the photoelectric conversion circuit.

16. The driving method according to claim 15, the pixel sensing circuit further comprising a switching circuit, the switching circuit being coupled between the output node and the photoelectric conversion circuit, the method further comprising:
turning on the switching circuit, storing the electric charges in the second storage capacitor, and then outputting the electric charges generated by the photoelectric conversion circuit to the source follower circuit by the transmission circuit after generating the electric charges in response to the incident light by the photoelectric conversion circuit.

17. The driving method according to claim 16, the pixel sensing circuit further comprising a second reset circuit, the method further comprising:
resetting a voltage of the first node by the second reset circuit before outputting the electric charges generated by the photoelectric conversion circuit to the source follower circuit by the transmission circuit.

18. The driving method according to claim 17, wherein the resetting the voltage at the output node by the first reset circuit and the resetting the voltage of the first node by the second reset circuit are performed by a same reset signal.

* * * * *